United States Patent [19]
Ishii et al.

[11] Patent Number: 6,073,072
[45] Date of Patent: Jun. 6, 2000

[54] APPARATUS AND METHOD FOR MONITORING REVOLUTION SPEED VALUE DETECTED BY MEANS OF REVOLUTION SPEED SENSOR TO DETERMINE OCCURRENCE OF ABNORMALITY IN REVOLUTION SPEED SENSOR APPLICABLE TO CONTINUOUSLY VARIABLE TRANSMISSION FOR VEHICLE

[75] Inventors: Shigeru Ishii; Yoshihide Shinso; Tateki Jozaki, all of Kanagawa; Yuichi Asai, Nagoya, all of Japan

[73] Assignees: Nissan Motor Co., Ltd., Yokohama; Aichi Machine Industry, Ltd., Nagoya, both of Japan

[21] Appl. No.: 09/006,386

[22] Filed: Jan. 13, 1998

[30] Foreign Application Priority Data

Jan. 24, 1997 [JP] Japan ................................. 9-011624

[51] Int. Cl.$^7$ ................................................ B60K 41/02
[52] U.S. Cl. ............................... 701/63; 701/51; 701/53; 701/63; 701/95; 477/154; 477/174
[58] Field of Search ................................. 701/53, 58, 63, 701/65, 34, 51, 52, 87, 95; 477/46, 107, 154, 155, 168, 174; 123/406.24, 436; 73/117.3

[56] References Cited

U.S. PATENT DOCUMENTS

| | | | |
|---|---|---|---|
| 5,199,399 | 4/1993 | Shibuya ................................ | 477/111 |
| 5,558,596 | 9/1996 | Adachi et al. ....................... | 701/57 |
| 5,628,700 | 5/1997 | Yamada et al. ...................... | 474/18 |
| 5,697,866 | 12/1997 | Okahara .............................. | 477/169 |
| 5,730,680 | 3/1998 | Toukura .............................. | 477/46 |
| 5,754,970 | 5/1998 | Takasaki et al. ................... | 701/69 |

FOREIGN PATENT DOCUMENTS

| | | |
|---|---|---|
| 0 228 884 | 7/1987 | European Pat. Off. . |
| 0 385 244 | 9/1990 | European Pat. Off. . |
| 7-317389 | 12/1985 | Japan . |

*Primary Examiner*—Gertrude Arthur
*Attorney, Agent, or Firm*—Foley & Lardner

[57] ABSTRACT

Described are apparatus and method for monitoring revolution speed values detected by corresponding revolution speed sensors too determine whether at least any one of an engine revolution speed sensor, a continuously variable transmission input axle revolution speed sensor, and a continuously variable transmission output axle revolution speed sensor has failed according to detected values of the engine revolution speed sensor, the input axle revolution speed sensor, and the output axle revolution speed sensor and a detected value of an instantaneous gear shift ratio when a lock-up mechanism is in a lock-up state. If all of three formulae on predetermined correlations are established, all of the sensors are determined to be normally operated. If any one or two of the three formulae are not established, the failure one of the three sensors is identified. The three correlation formulae are based as follows: 1) $N_E = N_{PRI}$; 2) $N_{PRI} = N_{SEC} \times CN$; and 3) $N_E = N_{PRI} \times C_N$, wherein $N_E$ denotes the engine revolution speed, $N_{PRI}$ denotes the input axle revolution speed, $C_N$ denotes the detected instantaneous gear shift ratio, and $N_{SEC}$ denotes the detected output axle revolution speed.

20 Claims, 2 Drawing Sheets

APPARATUS AND METHOD FOR MONITORING REVOLUTION SPEED VALUE DETECTED BY MEANS OF REVOLUTION SPEED SENSOR TO DETERMINE OCCURRENCE OF ABNORMALITY IN REVOLUTION SPEED SENSOR APPLICABLE TO CONTINUOUSLY VARIABLE TRANSMISSION FOR VEHICLE

The contents of Application No. Heisei 9-011624, with a filing date of Jan. 24, 1997 in Japan, are herein incorporated by reference.

BACKGROUND OF THE INVENTION a) Field of the Invention

The present invention relates to apparatus and method for monitoring revolution speed values detected by means of revolution speed sensors to be used to control at least gear shift ratio of a continuously variable transmission for a vehicle to determine whether at least one of the revolution speed sensors has failed. The revolution speed sensors include an engine revolution speed sensor and a drive axle (input) and driven axle (output) revolution speed sensors of the continuously variable transmission.

b) Description of the Related Art

A Japanese Patent Application First Publication No. Heisei 7-317894 published on Dec. 8, 1995 exemplifies a previously proposed gear-shift-ratio-and-lock-up control apparatus for a continuously variable transmission in a vehicle.

In the previously proposed gear-shift-ratio-and-lock-up control apparatus disclosed in the above-identified Japanese Patent Application First Publication, the gear shift ratio and lock-up controls are advanced on the basis of detected values of an engine revolution speed, an input axle (turbine axle of a fluid coupling device) revolution speed of the continuously variable transmission, an output axle revolution speed (vehicle speed) of the continuously variable transmission, an opening angle of an engine throttle valve, a shift position selection switch, a brake signal, and a longitudinal (vehicular forward/backward) acceleration, and so forth.

It is noted that in the above-described previously proposed gear-shift-ratio-and-lock-up control apparatus, the gear shift ratio and lock-up control using a stepping motor and a lock-up clutch are carried out on the basis of read values of the revolution speed of the engine output axle, the input axle (turbine axle) and output axle (vehicle speed) of the continuously variable transmission from the corresponding revolution speed sensors with detected values of the revolution speed sensors being deemed to be correct.

SUMMARY OF THE INVENTION

Hence, if the gear shift ratio and lock-up controls were carried out on the basis of an erroneously abnormal detection value from any one or more of the revolution speed sensors which has failed such as due to a broken line or short-circuiting, an erroneous gear shift ratio control and/or erroneous lock-up control would be carried out. Consequently, it is not possible to achieve an appropriate running characteristic of the vehicle according to a running condition of the vehicle.

It is, therefore, an object of the present invention to provide apparatus and method for monitoring detected values of revolution speeds from respective revolution speed sensors used for a gear-shift-and-lock-up control for a continuously variable transmission to determine whether any one or more of the revolution speed sensors has failed applicable to a continuously variable transmission, the revolution speed sensors including at least a first revolution speed sensor for detecting a revolution speed of an input axle (primary side, or drive axle) of the continuously variable transmission and a second revolution speed sensor for detecting a revolution speed of an output axle (secondary side or driven axle) of the continuously variable transmission which can accurately determine a failure (or abnormality) of any one of the revolution speed sensors.

The above-described object can be achieved by providing an apparatus for a continuously variable transmission, comprising: a first revolution speed sensor for detecting a first revolution speed of an input axle of the continuously variable transmission; a second revolution speed sensor for detecting a second revolution speed of an output axle of the continuously variable transmission; a gear shift ratio detector for detecting an instantaneous gear shift ratio of the continuously variable transmission; and an abnormality monitor for reading detected values of the first and second revolution speeds from the corresponding first and second revolution speed sensors and the detected instantaneous gear shift ratio from the gear shift ratio detector and for determining whether at least either of the first or second revolution speed sensor has failed on the basis of predetermined correlations between the respective detected values of the first and second revolution speeds and the detected instantaneous gear shift ratio.

The above-described object can also be achieved by providing an apparatus for a continuously variable transmission, comprising: a first revolution speed sensor for detecting a first revolution speed of an input axle of the continuously variable transmission; a second revolution speed sensor for detecting a second revolution speed of an output axle of the continuously variable transmission; a gear shift ratio detector for detecting an instantaneous gear shift ratio of the continuously variable transmission; and an abnormality monitor for reading detected values of the first and second revolution speeds from the corresponding first and second revolution speed sensors and the detected instantaneous gear shift ratio from the gear shift ratio detector and for determining whether at least either of the first or second revolution speed sensor has failed on the basis of predetermined correlations between the respective detected values of the first and second revolution speeds and the detected instantaneous gear shift ratio.

The above-described object can also be achieved by providing a method for monitoring revolution speed values detected by corresponding revolution speed sensors and used to control at least a gear shift ratio of a continuously variable transmission to determine whether at least any one of the revolution speed sensors has failed, comprising the steps of: detecting a first revolution speed of an input axle of the continuously variable transmission through a first revolution speed sensor; detecting a second revolution speed of an output axle of the continuously variable transmission through a second revolution speed sensor; determining an instantaneous gear shift ratio of the continuously variable transmission through a gear shift ratio detector; and reading detected values of the first and second revolution speeds from the first and second revolution speed sensors and the detected instantaneous gear shift ratio from the gear shift ratio detector and for determining whether at least either of the first or second revolution speed sensor has failed on the basis of predetermined correlations between the respective detected values of the first and second revolution speeds and the detected instantaneous gear shift ratio.

BEST MODE FOR CARRYING OUT THE INVENTION

Reference will hereinafter be made to the drawings in order to facilitate a better understanding of the present invention.

Figure 1:
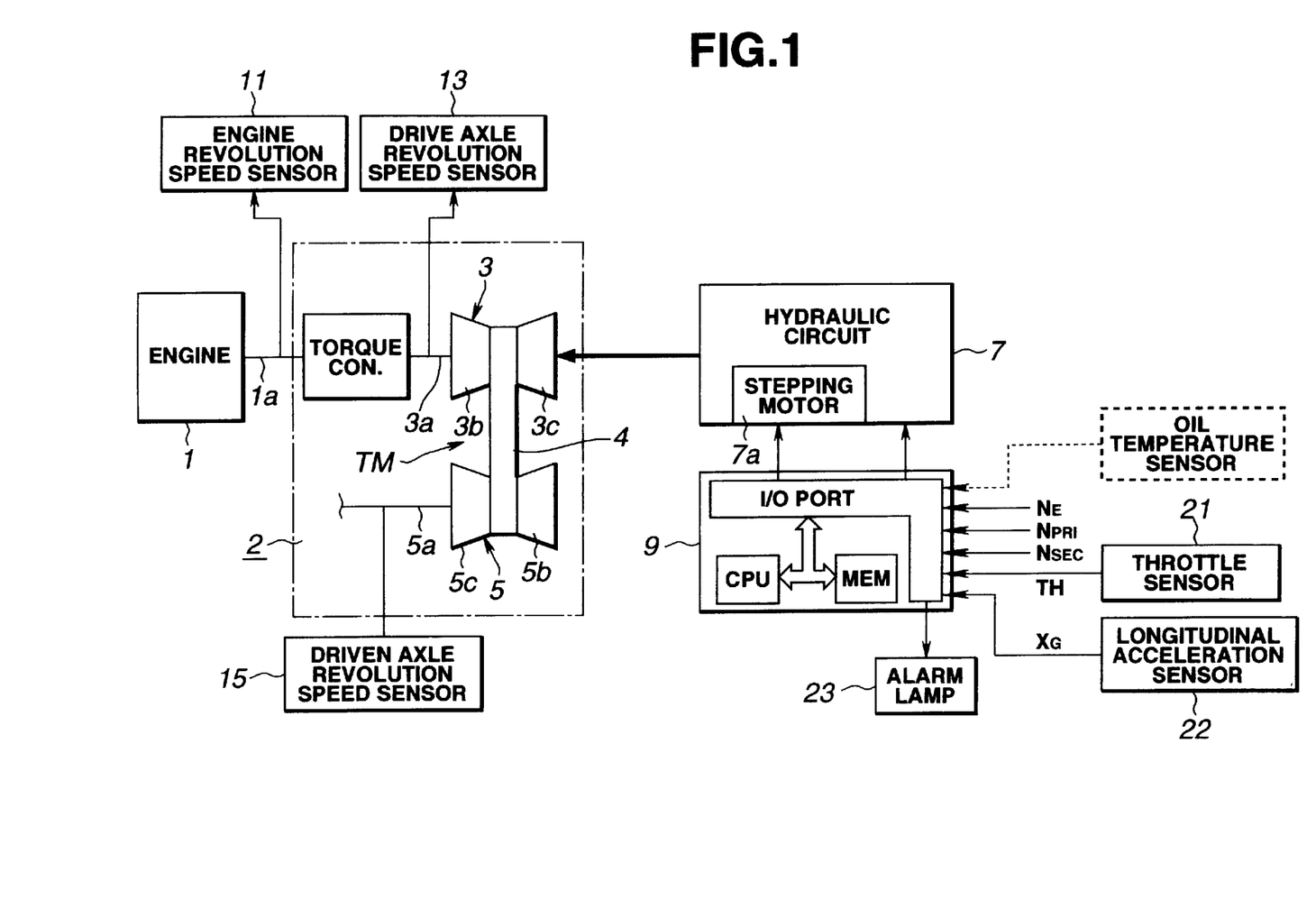
FIG. 1 is a schematic circuit block diagram of a preferred embodiment of an apparatus for monitoring detected values from revolution speed sensors used to control at least gear shift ratio of a continuously variable transmission to determine whether any one or more of the revolution speed sensors has failed.

FIG. 1 shows a circuit block diagram of a gear-shift-ratio-and-lock-up control system for a continuously variable transmission to which a revolution speed sensor abnormality monitoring apparatus according to the present invention is applicable A continuously variable transmission 2 is connected to an output axle of an engine 1 as a prime mover of an automotive vehicle.

The continuously variable transmission 2 includes a torque converter TC (a kind of a fluid coupling device) having a lock-up mechanism and which is connected to the output axle of the engine 1 and a continuously variable transmission mechanism TM connected to a turbine shaft (axle) of the torque converter TC.

The continuously variable transmission mechanism TM is a V-belt type continuously variable transmission including, for example, a drive pulley 3, a V belt 4 in an endless form, and a driven pulley 5 linked so as to enable a transmission of a driving force from the drive pulley 3 and V-shaped belt 4. The drive pulley 3 includes: a stationary conically-shaped plate 3b integrally rotating with a drive axle 3a linked to the output axle of the torque converter TC; and a movable conically-shaped plate 3c opposed to the stationary conically-shaped plate 3b so as to form a letter V-shaped pulley groove therebetween and movable in an axial direction of the drive axle 3a according to a hydraulic (oil) pressure acted upon a drive pulley cylinder (not shown). The driven pulley 5 includes: a stationary conically-shaped plate 5b installed on the driven axle 5a and integrally rotating with the driven axle 5a; and a movable conically-shaped plate 5c movable in an axial direction of the driven axle 5a according to the hydraulic pressure acted upon a driven pulley cylinder chamber (not shown).

A hydraulic circuit 7 controls the hydraulic pressures supplied to the drive pulley cylinder chamber and supplied to the driven pulley cylinder chamber so as to continuously vary a gear shift ratio of the continuously variable transmission 2.

Figure 2:
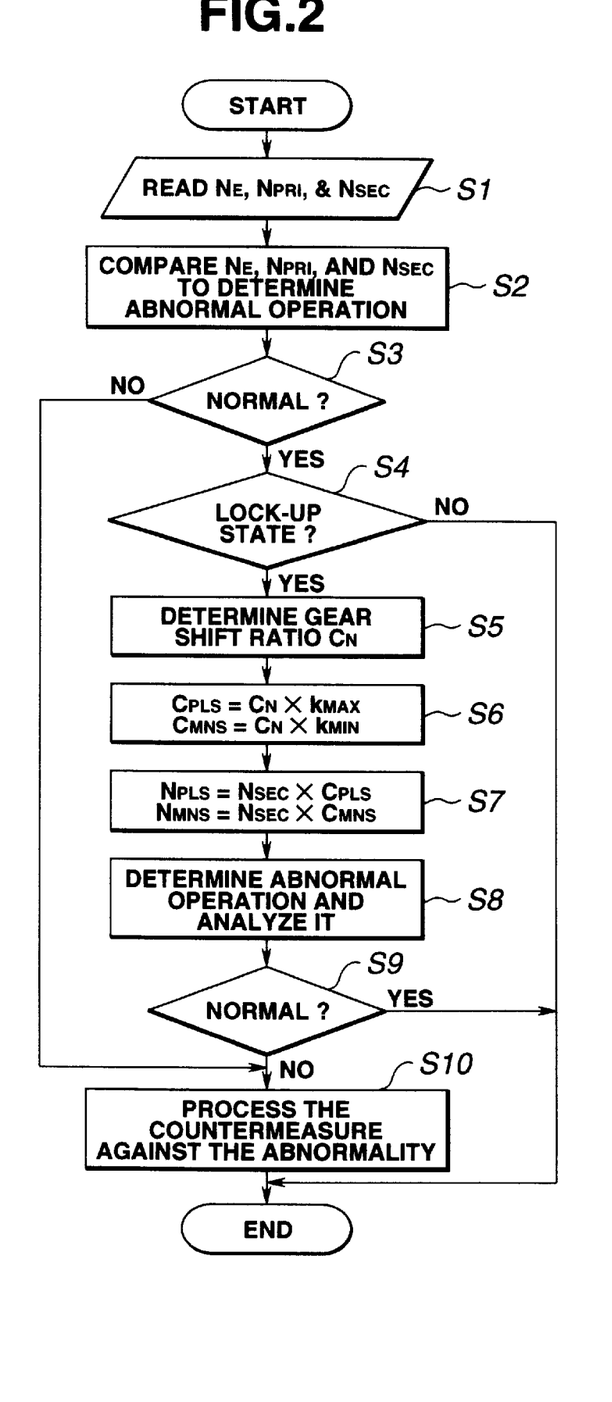
FIG. 2 is an operational flowchart for explaining a monitor processing routine executed by a controller shown in FIG. 1.

The hydraulic circuit 7 is exemplified by a Japanese Patent Application First Publication No. Heisei 7-317894 published on Dec. 8, 1995 and exemplified by FIG. 2 of an allowed U.S. patent application Ser. No. 08/450,642 (attorney docket No. 32926/0961), (the disclosure of which is herein incorporated by reference).

That is to say, a stepping motor 7a is incorporated into the hydraulic circuit 7 so as to adjust each essential element of the hydraulic circuit 7. For example, when a revolution stepped) angle of the stepping motor 7a is zero, the shift gear ratio is set to indicate a maximum. The shift gear ratio is varied according to the revolution angle of the stepping motor 7a.

In more details, when the stepping motor 7a is revolved in, for example, a clockwise direction in a stepwise manner, the hydraulic pressure within the drive pulley cylinder chamber is reduced and that in the driven pulley cylinder chamber is, in turn, increased. Thus, a width of the letter V-shaped pulley groove of the drive pulley 3 is further widened but that of the letter V-shaped pulley groove of the driven pulley 5 is further narrowed. Consequently, the gear shift ratio becomes enlarged. On the other hand, when the stepping motor 7a is revolved in a counterclockwise direction, the hydraulic pressure of the drive pulley cylinder chamber is increased but that of the driven pulley cylinder chamber is reduced. Consequently, the width of the letter V-shaped pulley groove of the drive pulley 3 becomes narrowed but the width of the letter V-shaped groove of the driven pulley 5 is widened so that the gear shift ratio becomes reduced.

It is noted that, in the embodiment, an engine revolution speed sensor 11 is disposed on an output axle 1a of the engine 1, a drive axle revolution speed sensor 13 is disposed on a drive axle 3a of the driven pulley 3, and a driven axle revolution speed sensor 15 is disposed on a driven axle 5a of the driven pulley 5.

A controller (gear-shift-ratio-and-lock-up controller) 9 receives an engine revolution speed $N_E$, a revolution speed $N_{PRI}$ of the drive axle 3a, and a revolution speed $N_{SEC}$ of the driven axle 5a detected by the respectively corresponding engine revolution speed sensor (prime mover revolution speed sensor) 11, drive axle revolution speed sensor (input axle revolution speed sensor) 13, and driven axle revolution speed sensor 15 (output axle revolution speed sensor).

The controller 9 drives the stepping motor 7a so as to control the stepped (revolution) angle of the stepping motor 7a on the basis of the received revolution speeds $N_E$, $N_{PRI}$, and $N_{SEC}$ and, for example, detected values of an opening angle TH of a throttle valve of the engine 1 by means of a throttle valve sensor 21, vehicular forward/backward acceleration $X_G$ (longitudinal acceleration) of an accelerometer (forward/rearward acceleration sensor) 22, and so forth. Consequently, the controller 9 controls the gear shift ratio according to a running condition of the vehicle. In addition, the controller 9 performs the lock-up control by controlling the hydraulic pressure supplied to a lock-up oil chamber (not shown in FIGS. 1 and 2) in the torque converter TC.

The gear-shift-ratio-and-lock-up controller 9, as shown in FIG. 1, includes: a microcomputer and its peripheral circuit having an Input/Output Port for inputting detection signals of each sensor described above and for outputting drive signals (drive command) to the hydraulic circuit 7 including the stepping motor 7a; a calculation processing block such as a CPU (Control Processing Unit) for performing predetermined calculations on the basis of various detection signals described above; and a MEM (Memory) for storing a processing program required for the CPU to perform the predetermined calculations and storing predetermined constants or coefficients.

The gear-shift-ratio-and-lock-up controller 9 outputs a drive command signal to the stepping motor 7a and command signals to each part (normally, various electromagnetic valves) of the hydraulic circuit 7 and performs an abnormality monitoring process for each revolution speed sensor.

First, respective comparisons of the engine revolution speed $N_E$ of the engine revolution speed sensor 11 with the drive axle revolution speed $N_{SEC}$ of the drive axle revolution speed sensor 13 and of the drive axle revolution speed $N_{PRI}$ of the drive axle revolution speed $N_{SEC}$ of the driven axle revolution speed sensor 13 are made. For example, in spite of the fact that the driven axle revolution speed $N_{SEC}$ is equal to or above a first predetermined value such as to be enabled to deem for the vehicle to run, the engine revolution speed $N_E$ is equal to or below a second predetermined value such as a minimum value of the engine revolution speed at which the vehicle can be determined to be running. In this case, it can be estimated that the engine revolution speed $N_E$ indicates an abnormal value deviated from the normal value thereof and it can be determined that a failure in the engine revolution speed sensor 11 has occurred. In addition, for example, suppose that when a predetermined gear shift ratio is given, the driven axle revolution speed $N_{SEC}$ has been raised to be equal to or above a third predetermined value before the drive axle revolution speed $N_{PRI}$ indicates equal to or above a fourth predetermined value. Or, suppose that in spite of the fact that the drive axle revolution speed $N_{PRI}$ which is currently above a fifth predetermined value is abruptly decreased and an abrupt deceleration occurs, the driven axle revolution speed $N_{SEC}$ is not varied. At this time, since it can be estimated that the abnormality in the driven axle revolution speed sensor 15 occurs so that the detected value of the driven axle revolution speed $N_{SEC}$ becomes erroneously abnormal.

In addition, for example, suppose when the predetermined gear shift ratio is given, the drive axle revolution speed $N_{PRI}$ is equal to or above a sixth predetermined value before the driven axle revolution speed $N_{SEC}$ indicates equal to or above a seventh predetermined value, or in spite of the fact that the driven axle revolution speed $N_{SEC}$ which is currently above an eighth predetermined value is abruptly reduced to indicate an abrupt deceleration, the drive axle revolution speed $N_{PRI}$ remains unchanged. In either case, it can be estimated that since the abnormality occurs in the drive axle revolution speed $N_{PRI}$ so that the detected value from the drive axle revolution speed sensor 13 becomes erroneously abnormal.

When any one of the revolution speed sensors 11, 13, or 15 is determined to be failed through the above-described abnormality monitoring in the comparisons of the respective revolution speed sensors, a predetermined abnormality determination process is advanced. For example, a warning lamp is blinked at a frequency determined by the corresponding one of the three revolution speed sensors 11, 13, or 15 which has been determined to be failed.

When no abnormality in any one of the revolution speed sensors is determined, the controller 19 determines whether the instantaneous lock-up mechanism is in a lock-up state. In the lock-up state, the abnormality monitoring is continued. Specifically, the present (an instantaneous) gear shift ratio of the continuously variable transmission mechanism TM is determined from the corresponding command signal to the lock-up mechanism in the hydraulic circuit 7, the abnormality monitoring process is advanced on the basis of the determined instantaneous gear shift ratio $C_N$ and detected values $N_E$, $N_{PRI}$, and $N_{SEC}$ of the respective revolution speed sensors 11, 13, and 15.

It is noted that the determined gear shift ratio $C_N$ is determined from the stepped number (or revolution angle) of the stepping motor 7a since the gear shift ratio of the continuously variable transmission mechanism TM is varied according to the revolution angle (stepped number) of the stepping motor 7a.

In general, in the lock-up state, the output axle 1a of the engine 1 is integrally revolved together with the drive axle 3a of the drive pulley 3.

It is noted that the determined gear shift ratio $C_N$ is determined from the stepped number (or revolution angle) of the stepping motor 7a since the gear shift ratio of the continuously variable transmission mechanism TM is varied according to the revolution angle (stepped number) of the stepping motor 7a.

In general, in the lock-up state, the output axle 1a of the engine 1 is integrally revolved together with the drive axle 3a of the drive pulley 3 so that the following equation (1) is established between the engine revolution speed $N_E$ and the drive axle revolution speed $N_{PRI}$.

Since the revolution input of the continuously variable transmission mechanism TM is gear shifted and outputted, the following equation (2) is established between the drive axle revolution speed $N_{PRI}$, the driven axle revolution speed $N_{SEC}$, and the determined gear shift ratio $C_N$.

Since the equation (1) is established, the following equation (3) is accordingly established.

$$N_E = N_{PRI} \quad (1)$$

$$N_{PRI} = N_{SEC} \times C_N \quad (2)$$

$$N_E = N_{SEC} \times C_N \quad (3).$$

It is noted that the respectively detected values of the three revolution speed sensors $N_E$, $N_{SEC}$, and $N_{PRI}$ include errors inherent to the corresponding sensor circuits themselves or errors in their detected values not caused by line breakage or short-circuiting. In addition, since the determined gear shift ratio $C_N$ is estimated from the stepped numbers of the stepping motor 7a, an error between the actual gear shift ratio and the determined gear shift ratio $C_N$ is included.

Hence, with these facts in mind, for the equation (1), the abnormality determination is based on the following formula (4). If the following formula is not established but established as $|N_E - N_{PRI}| > N\alpha$, the further abnormality determination process is advanced.

$$|N_E - N_{PRI}| \leq N\alpha \quad (4).$$

In the equation (4), $N\alpha$ denotes an allowable range limit value.

Furthermore, for the above equations (2) and (3), previously set error upper limit coefficient $K_{MAX}$ and previously set error lower limit coefficient $K_{MIN}$ are multiplied by the determined shift gear ratio $C_N$ so that abnormality determining gear shift ratios $C_{PLS}$ and $C_{MNS}$ with the errors included in the determined gear shift ratio $C_N$ added are derived (refer to the following equations (5) and (6)). The following formulae (9) and (10) are determined to be established or not established on the basis of abnormality determining revolution speeds $N_{PLS}$ and $N_{MNS}$ (equations (7) and (8)) derived by the determined gear shift ratios $C_{PLS}$ and $C_{MNS}$ multiplied by the driven axle revolution speed $N_{SEC}$, the engine revolution speed $N_E$, and the drive axle revolution speed $N_{PRI}$.

When any one of the three formulae (4), (9), and (10) are not established, any one or more of the revolution speed sensors 11, 13, and 15 have been determined to be failed. Then, the controller 9 identifies which one, two, or three of the revolution speed sensors 11, 13, and 15 have been failed on the basis of TABLE 1 according to any combination of the result of determinations of the result of determinations in the three formulae (4), (9), and (10), i.e., the three equations (1), (2), and (3).

$$C_{PLS} = C_N \times K_{MAX} \quad (5),$$
$$C_{MNS} = C_N \times K_{MIN} \quad (6),$$
$$N_{PLS} = N_{SEC} \times C_{PLS} \quad (7),$$
$$N_{MNS} = N_{SEC} \times C_{MNS} \quad (8),$$
$$N_{MNS} \leq N_{PRI} \leq N_{PLS} \quad (9), \text{ and}$$
$$N_{MNS} \leq N_E \leq N_{PLS} \quad (10).$$

TABLE 1

|   | (1) or (4) | (2) or (9) | (3) or (10) | Result of determination |
|---|---|---|---|---|
| a | Established (Yes) | Established (Yes) | Established (Yes) | All rev. speed sensors are normal. |
| b | Established (Yes) | Established (Yes) | Not Established (No) | All rev. speed sensors are normal. |
| C | Established (Yes) | Not Established (No) | Established (Yes) | All rev. speed sensors are normal. |
| d | Established (Yes) | Not Established (No) | Not Established (No) | The detected value of $N_{SEC}$ is erroneously abnormal. |
| e | Not Established (No) | Established (Yes) | Established (Yes) | All rev. speed sensors are normal. |
| f | Not Established (No) | Established (Yes) | Not Established (No) | The detected value of $N_E$ is erroneously abnormal. |
| g | Not Established (No) | Not Established (No) | Established (Yes) | The detected value of $N_{PRI}$ is erroneously abnormal. |
| h | Not Established (No) | Not Established (No) | Not Established (No) | Cannot identify failed one of the rev. speed sensors. |

It is noted that in cases of the combinations of b and c on TABLE 1, it cannot be present that the equation (2) or (3) is not established provided that the equation (1) is established, the controller 9 can determine that no abnormal revolution speed sensor is found (no failure in all of the revolution speed sensors occurs) and can determine that the gear-shift-ratio-and-lock-up controller 9 itself has failed. Similarly, in the case of the combination e, since it cannot be present that, although the equation (1) cannot be established provided that the equations (2) and (3) are established, the controller 9 can determine that no abnormality (failure) is found in the revolution speed sensors 11, 13, and 15.

In the case of the combination d, it can be predicted that the driven axle revolution speed $N_{SEC}$ not included in the equation (1) is erroneously abnormal since only the equation (1) is established. Similarly, in the case of the combination f, it can be predicted that the engine revolution speed sensor $N_E$ not included in the equation (2) is erroneously abnormal since only the equation (2) is established. In the case of the combination g, the drive axle revolution speed $N_{PRI}$ not included in the equation(3) is erroneously abnormal since only the equation (3) is established.

Next, an operation of the embodiment of the abnormality monitoring apparatus shown in FIG. 1 will be described below.

FIG. 2 is an operational flowchart for explaining the abnormality monitoring process executed by the gear-shift-ratio-and-lock-up controller 9 inputs detected values of the respective revolution speed sensors 11, 13, and 15, reads the detected values of the opening angle TH from the throttle sensor 21 and forward/backward (longitudinal) acceleration sensor 22, derives a target gear shift ratio by referring to a control map previously stored on the basis of a vehicle speed based on the driven axle revolution speed NSEC and the engine revolution speed NE, and drives the stepping motor 7a according to the derived target gear shift ratio so as to activate the hydraulic circuit 7, thus the hydraulic pressures within the cylinder chambers of the driven and driven pulleys being controlled to perform the gear shift ratio of the continuously variable transmission mechanism TM. In addition, the controller 9 derives a lock-up vehicle speed at which the lock-up mechanism is in a lock-up state on the basis of the forward/backward acceleration $X_G$ and governs the hydraulic circuit 7 to control the hydraulic pressure to be supplied to a lock-up oil chamber so that the lock-up mechanism is in a lock-up state when the vehicle speed reaches a target lock-up vehicle speed. In addition, the controller 9 executes the abnormality monitoring process for, for example, each predetermined period on the basis of the detected values of the respective revolution speed sensors 11, 13, and 15.

In more details, with reference to FIG. 2, the gear-shift-ratio-and-lock-up controller 9 governs the hydraulic circuit 7 to control the hydraulic pressure to be supplied to a lock-up oil chamber so that the lock-up mechanism is in the lock-up state when the vehicle speed reaches to a target lock-up vehicle speed.

In addition, the controller 9 executes the abnormality monitoring process for, for example, each predetermined period on the basis of detected values of the respective revolution speed sensors 11, 13, and 15.

In more details, with reference to FIG. 2, the gear-shift-ratio-and-lock-up controller 9 reads the engine revolution speed $N_E$, the drive axle revolution speed $N_{PRI}$, and the driven axle revolution speed $N_{SEC}$ from the respectively corresponding revolution speed sensors 11, 13, and 15 at a step S1.

At a step S2, the controller 9 determines whether any one or more of the revolution speed sensors have failed on the basis of the relationship between the engine revolution speed $N_E$ and the driven axle revolution speed $N_{SEC}$ and the relationship between the drive axle revolution speed $N_{PRI}$ and the driven axle revolution speed $N_{SEC}$.

For example, during the vehicular running, suppose that the engine revolution speed $N_E$ is extremely reduced due to a broken line in the engine revolution speed sensor 11. At this time, although the driven axle revolution speed $N_{SEC}$ indicates a value such that the vehicle is running, the engine revolution speed $N_E$ indicates an extremely low value. Then, the controller 9 determines that the engine revolution speed $N_E$ is erroneously abnormal and the failure in the engine revolution speed sensor 11 has occurred.

Suppose, in addition, that such an abnormality as the broken line in the drive axle revolution speed $N_{PRI}$ occurs. In this case, if the vehicle is abruptly decelerated, the driven axle revolution speed $N_{SEC}$ is abruptly reduced but the drive axle revolution speed $N_{PRI}$ does not change. Hence, the controller 9 determines that the abnormality in the drive axle revolution speed sensor 13 occurs. On the contrary, when the driven axle revolution speed $N_{SEC}$ does not change although the drive axle revolution speed $N_{PRI}$ is abruptly reduced, the controller 9 can determine the abnormality in the drive axle revolution speed $N_{SEC}$.

In addition, suppose that a specific value is outputted from the drive axle speed sensor 13 due to a short-circuiting in the drive axle revolution speed sensor 13. In this case, since it follows that the driven axle revolution speed $N_{SEC}$ is raised equal to or above the predetermined value when the gear shift ratio of the continuously variable transmission mechanism TM is a predetermined gear shift ratio, the controller 9 determines that the abnormality in the drive axle revolution speed 13 has failed.

On the contrary, suppose that a specific value is outputted from the driven axle revolution speed sensor 15 due to the short-circuiting in the driven axle revolution speed sensor 15. Since it follows that the drive axle revolution speed $N_{PRI}$ is raised equal to or above the predetermined value, the controller 9 determines that the abnormality in the drive axle revolution speed sensor 15 has occurred.

If, at a step S3, the controller 9 has determined that at least any one of the revolution speed sensors 112, 13, and 15 has failed (Yes), the routine goes to a step S10 in which the controller 9 executes a predetermined process against the abnormality determination.

For example, the controller 9 commands an alarm lamp 23 shown in FIG. 1 to blink the alarm lamp to inform the vehicular driver of the abnormality in any one of the revolution speed sensors at a frequency dependent on the failed revolution speed sensor 11, 13, and 15. Or, the controller 9 performs a fail-safe operation such that no continuous variable gear shift ratio control or no lock-up control is advanced. On the other hand, in a case where no abnormality is found at the step S3 (Yes), the routine goes to a step S4 in which the controller 9 determines, for example, whether the lock-up mechanism of the torque converter TC is in the lock-up state on the basis of, for example, a lock-up flag in the controller 9 itself which is set to "1" when the hydraulic pressure to render the lock-up mechanism in the lock-up state in the processing routine of the lock-up control is supplied to the lock-up oil chamber. If the lock-up mechanism is not in the lock-up state (No) at the step S4, the controller 9 itself ends the present abnormality monitoring routine.

On the other hand, if the controller 9 is in the lock-up state, the controller 9, thus, reads the above equations (4), (9), and (10) at a step S8.

For example, suppose that all of the engine revolution speed sensor 11, the drive axle revolution speed sensor 13 and the driven axle revolution speed sensor 15 are normally operated. In this case, since the output axle 1a of the engine 1 and the drive axle 3a of the drive pulley 3 should integrally be revolved during the lock-up state, both of the engine revolution speed $N_E$ and the drive axle revolution speed $N_{PRI}$ are approximately equal and a product between the drive axle revolution speed $N_{SEC}$ and the drive axle revolution speed $N_{PRI}$ is approximately equal to the drive axle revolution speed $N_{PRI}$.

In addition, since both of the engine and the drive axle revolution speeds $N_E$ and $N_{PRI}$ are approximately equal to each other, the product between the driven axle revolution speed $N_{SEC}$ and the determined gear shift ratio $C_N$ is approximately made equal to the engine revolution speed $N_E$. Hence, since, in this case, the equations (4), (9), and (10) are satisfied, the revolution speed sensors 11, 13, and 15 are determined to be all normal since the combination of a shown in TABLE 1 is resulted.

Then, since each revolution speed sensor is normal at the step S9, the present abnormality monitoring routine is ended. Since the abnormality monitoring routine shown in FIG. 2 is executed for each predetermined period, the same routine is repeated after a predetermined period of time has passed.

Suppose that the engine revolution speed sensor 11 is broken when each revolution speed sensor 11, 13, and 15 has determined to be normally operated. In this case in spite of the fact that the driven axle revolution speed $N_{SEC}$ represents the value equal to or above the predetermined value, the engine revolution speed $N_E$ is equal to or below the predetermined value. Hence, the controller 9 determines that the abnormality in the engine revolution speed sensor 11 is found. However, suppose that although the abnormality in the engine revolution speed sensor 11 is found, the engine revolution speed $N_E$ indicates a value equal to or above the predetermined value.

In this case wherein the comparison of the engine revolution speed $N_E$ with the driven axle revolution speed $N_{SEC}$, the controller 9 would determine that no abnormality in the engine revolution speed sensor 11 is found. At this time, if the lock-up mechanism is in the lock-up state, the abnormality monitoring process is continuously executed in which the instantaneous gear shift ratio $C_N$ is determined from the step number of the stepping motor 7a and the abnormality determining process is advanced on the basis of the equations (5) through (10). In this case, since the drive and driven axle revolution speed sensors 13 and 15 are normally operated, the formula (9) is satisfied but neither the formula (4) nor (10) is satisfied. Then, since the result of the abnormality determination of the combination of f in TABLE 1 is indicated, the controller 9 finally determines that the engine revolution speed $N_E$ is erroneously abnormal so that the engine revolution speed sensor 11 has failed.

In addition, for example, suppose that a detection accuracy of the drive axle revolution speed sensor 13 is lowered. In this case, at the step S3 in which the abnormality monitoring on the basis of the comparison between the drive axle revolution speed $N_{PRI}$ and the driven axle revolution speed $N_{SEC}$ is made, the controller 9 makes an erroneous determination that the drive axle revolution speed sensor 13 operates normally since the revolution speed value is outputted to some degree.

However, in the lock-up state, the abnormality monitoring process is further advanced. Since the accuracy of the drive axle revolution speed $N_{PRI}$ is reduced, the formula of (10) is satisfied but neither the formula (4) nor (9) is satisfied. Consequently, the result of the abnormality determination in the combination of g in TABLE 1 is indicated. Then, at the step S8, the controller 9 determines that the drive axle revolution speed $N_{PRI}$ is erroneously abnormal, i.e., that the abnormality in the drive axle revolution speed sensor 13 is found.

Similarly, in a case where the detection accuracy of the driven axle revolution speed sensor 15 is reduced, in the process at the step S3, the controller 9 once determines that the drive axle revolution speed sensor 15 operates normally. However, in the lock-up state and in the abnormality determination, the engine revolution speed $N_{PRI}$ are normal so that although the formula (4) is satisfied, neither the formula (9) nor (10) is satisfied. Hence, the result of the determination gives the combination of d in TABLE 1 and the controller 9 determines that the drive axle revolution speed $N_{SEC}$ is erroneously abnormal and the driven axle revolution speed sensor 15 is determined to have failed at the step S8.

Suppose that both of the detected values of $N_E$ and $N_{PRI}$ of the engine revolution speed sensor 11 and the drive axle revolution speed sensor 13 are erroneously abnormal, all equations of (4), (9), and (10) are not satisfied. Hence, the combination of h in TABLE 1 is resulted. The controller 9 determines that the abnormality in any one, two, or three of the revolution speed sensors has been found although the controller 9 cannot identify the failed revolution speed sensor.

Suppose that both of the detected values of $N_E$ and $N_{SEC}$ of the engine revolution speed sensor 11 and the driven axle revolution speed sensor 15 are erroneously abnormal or every detected value of the revolution speed sensors 11, 13, and 15 is erroneously abnormal, all equations of (4), (9), and (10) are not satisfied. Hence, the combination of h in TABLE 1 is resulted. The controller 9 determines that the abnormality in any one, two, or three of the revolution speed sensors has been found although the controller 9 cannot identify the failed revolution speed sensor.

Suppose, in addition, that although both formulae (4) and (10) are satisfied, the formula (9) is not satisfied. In this case, since the formula (9) is different from the formula (10) in the engine revolution speed $N_E$ and the drive axle revolution speed $N_{PRI}$, the formula (9) should naturally be satisfied provided that both of the formula (4) and formula (10) are satisfied. Hence, since no abnormality in any one of the revolution speed sensors is found, the controller 9 can determine that any error in the calculation process occurs. In this case, the combination of c is resulted, the controller 9 cannot determine that no abnormality in the revolution speed sensors is found.

Suppose, furthermore, that although the formulae (4) and (9) are satisfied, the formula (10) is not satisfied. In this case, the same determination as described above is made. The result of the determination is in the combination of c in TABLE 1 and the controller 9 determines that no abnormality in any one of the revolution sensors 11, 13, and 15 is found.

Hence, as described above, in a case where although each revolution speed sensor detects the corresponding one of the respective revolution speeds, the detected values themselves include erroneously abnormal (deviated from real detection values), the abnormality (failure) in any one of the respective revolution speed sensors $N_E$, $N_{PRI}$, and $N_{SEC}$ cannot be found by merely comparing the detected values of the respective revolution speeds $N_E$, $N_{PRI}$, and $N_{SEC}$.

However, the controller 9 can accurately determine the abnormality occurrence in any one, two, or thee of the respective revolution speed sensors 11, 13, and 15 depending on whether a predetermined correlation between the respective revolution speeds $N_E$, $N_{PRI}$, and $N_{SEC}$ is established.

Consequently, an accurate avoidance of the lock-up control or gear shift control can be made on the basis of the erroneous revolution speed values $N_E$, $N_{PRI}$, and $N_{SEC}$ of these revolution speed sensors 11, 13, and 15. The accurate avoidance of the lock-up control and/or the gear shift ratio control can be made which is difference from the normal vehicular running state.

In addition, since the controller 9 can determine whether the three correlation formulae (4), (9), and (10) are established concerning with the correlations between the respective revolution speeds $N_E$, $N_{PRI}$, and $N_{SEC}$ and determined instantaneous gear shift ratio, the controller 9 can identify which one of the revolution speed sensors 11, 13, and 15 has failed according to which one of the combinations of the correlation formulae (4), (9), and (10) is established.

Since the determination of the abnormality is made with error components included in the detected values of the respective revolution speeds $N_E$, $N_{PRI}$, and $N_{SEC}$ previously added, the erroneous determination of the abnormality due to the error components can accurately be avoided.

In addition, since the instantaneous gear shift ratio $C_N$ is determined on the basis of the step number of the stepping motor 7a, the gear shift ratio can easily be determined without installation of the new sensor exclusively used.

Furthermore, in the abnormality monitoring through the comparison of the varied condition in the respective revolution speeds $N_E$, $N_{PRI}$, and $N_{SEC}$, the gear shift ratio $C_N$ is determined only when no abnormality in any one of the respective revolution speed sensors 11, 13, and 15 can be found and a high accuracy of diagnosis based on the determined gear shift ratio $C_N$ is made so that a highly efficient abnormality determination can be made.

Although, in the embodiment described above, the gear shift ratio is determined on the basis of the step number of the stepping motor 7a, the gear shift ratio may be determined by a direct measurement of the gear shift ratio from the revolved angle of the stepping motor 7a. Alternatively, an interval of distance of the letter-V shaped groove formed between the drive pulley 3 and the driven pulley 5 may be measured by means of a stroke sensor. The gear shift ratio may be determined on the basis of a stroke sensor detection value.

In the embodiment described above, the V-shaped belt type continuously variable transmission mechanism is applied to the continuously variable transmission mechanism TM. However, for example, a toroidal type continuously variable transmission mechanism may be applied.

In the embodiment described above, the continuously variable transmission having the lock-up mechanism is applied. However, the present invention is applicable to the continuously variable transmission having no lock-up mechanism. In this case, the comparison between the ratio of the drive axle revolution speed $N_{PRI}$ and the drive axle revolution speed $N_{SEC}$ and the determined gear shift ratio $C_N$ may accurately be made so that the abnormality in either the drive axle revolution speed sensor 13 or the drive axle revolution speed 15 may highly accurately be determined.

In addition, in the embodiment, the error upper limit coefficient $K_{MAX}$ and the error lower limit coefficient $K_{MIN}$ are fixed. However, these coefficients $K_{MAX}$ and $K_{MIN}$ may be varied according to the vehicular running condition.

For example, when a gear shift variable of the gear shift ratio is large, a deformation such as a deflection occurs at each part of the continuously variable transmission mechanism TM such as the drive pulley 3 or the driven pulley 5, it follows that the gear shift ratio which is not in accordance with the command signal from the gear-shift-ratio-and-lock-up controller 9.

Hence, an error between the gear shift ratio recognized on the basis of the command signal issued from the gear-shift-ratio-and-lock-up controller 9 and the actual gear shift ratio is generated. Due to the error in the determined gear shift ratio, neither the formulae (9) nor (10) is satisfied so that the controller 9 may often erroneously determine the abnormality in any one of the revolution speed sensors.

For example, suppose that the gear shift ratio predicted on the basis of the command signal is determined. The change rate of the gear shift ratio is estimated from the predicted gear shift ratio and the previously held instantaneous gear shift ratio. As the change rate becomes large, both of the error upper limit coefficient $K_{MAX}$ and the error lower limit coefficient $K_{MIN}$ are largely set. Consequently, the erroneous determination on the abnormality can be avoided together with the increase in the error of the determined gear shift ratio due to the deformation occurred in the continuously variable transmission TM. It is noted that the error upper coefficient $K_{MAX}$ and the error lower coefficient $K_{MIN}$ may be variably set not only on the basis of the change rate of the gear shift ratio but also on the basis of an estimated vehicular running condition from the opening angle of the throttle valve detected by the throttle sensor 21 and from the vehicle speed detected by the driven axle revolution speed sensor 15.

In addition, in a case where a working oil temperature of the hydraulic circuit 7 is low, a viscosity of the working oil is high so that a response speed of the hydraulic pressure is reduced along with the revolution angle of the stepping motor 7a. Consequently, the error between the gear shift ratio held by the gear-shift-ratio-and-lock-up controller 9 and the actual gear shift ratio occurs.

Hence, as denoted by a broken line in FIG. 1, a working oil temperature sensor for detecting a working oil temperature sensor for detecting a working oil temperature of the hydraulic circuit 7 is installed.

As the working oil temperature is low on the basis of the detected value of the hydraulic circuit 7 in the gear-shift-ratio-and-lock-up controller 9, both error upper limit coefficient $K_{MAX}$ and error lower limit coefficient $K_{MIN}$ are largely set. Or alternatively, when the working oil temperature is as low as below a predetermined value, the abnormality monitoring in the revolution speed sensor is not carried out. However, along with a response delay in the continuously variable transmission mechanism TM, the erroneous determination of the abnormality in any one, two, or three of the respective revolution speed sensors can be avoided.

Furthermore, the microcomputer in the gear-shift-ratio-and-lock-up controller 9 may be substituted for by an individual digital circuit of calculations, shift registers, or so on.

In addition, the stepping motor may be replaced with a DC motor having a servo mechanism enabled to determine the revolution angle of the DC motor.

What is claimed is:

1. An apparatus for a continuously variable transmission, comprising:
   a first revolution speed sensor for detecting a first revolution speed of an input axle of the continuously variable transmission;
   a second revolution speed sensor for detecting a second revolution speed of an output axle of the continuously variable transmission;
   a gear shift ratio detector for detecting an instantaneous gear shift ratio of the continuously variable transmission; and
   an abnormality monitor for reading detected values of the first and second revolution speeds from the corresponding first and second revolution speed sensors and the detected instantaneous gear shift ratio from the gear shift ratio detector and for determining whether at least either of the first or second revolution speed sensor has failed on the basis of predetermined correlations between the respective detected values of the first and second revolution speeds and the detected instantaneous gear shift ratio.

2. An apparatus for a continuously variable transmission as claimed in claim 1, wherein the abnormality monitor further executes a predetermined process when determining that either of the first or second revolution speed sensor or both thereof have failed.

3. An apparatus for a continuously variable transmission as claimed in claim 1, which further comprises: a third revolution speed sensor for detecting a revolution speed of a prime mover associated with the continuously variable transmission; a fluid coupling device having a lock-up mechanism and through which a driving force of the prime mover is transmitted to the input axle of the variable transmission; and a lock-up determinator for determining whether the lock-up mechanism is in a lock-up state and wherein the abnormality monitor reads a detected value of the third revolution speed from the third revolution speed sensor and determines whether at least any one of the first, second, and third revolution speed sensors has failed on the basis of the respective predetermined correlations between the respective detected values of the first, second, and third revolution speeds and the detected instantaneous gear shift ratio when the lock-up determinator determines that the lock-up mechanism is in the lock-up state.

4. An apparatus for a continuously variable transmission as claimed in claim 3, wherein the abnormality monitor identifies the failed one of the first, second, and third revolution speed sensors according to any one of combinations of established and unestablished predetermined correlations from among the predetermined correlations.

5. An apparatus for a continuously variable transmission as claimed in claim 4, wherein the predetermined correlations are as follows:

$$N_E = N_{PRI};$$

$$N_{PRI} = N_{SEC} \times C_N; \text{ and}$$

$$N_E = N_{SEC} \times C_N,$$

wherein $N_E$ denotes the third revolution speed, $N_{PRI}$ denotes the first revolution speed, $N_{SEC}$ denotes the second revolution speed, $C_N$ denotes the detected instantaneous gear shift ratio.

6. An apparatus for a continuously variable transmission as claimed in claim 5, wherein the prime mover is an internal combustion engine mounted in an automotive vehicle, which further comprises a vehicular running condition detector for detecting a vehicular running condition, and wherein the abnormality monitor sets an allowable range in which each predetermined correlation has been established according to the detected vehicular running condition.

7. An apparatus for a continuously variable transmission as claimed in claim 6, wherein the continuously variable transmission includes a hydraulic circuit, which further comprises an oil temperature sensor for detecting a temperature of a working oil in the hydraulic circuit and wherein the abnormality monitor executes the set allowable range within which each predetermined correlation is established as the detected working oil temperature becomes low.

8. An apparatus for a continuously variable transmission as claimed in claim 7, wherein the continuously variable transmission includes an actuator for actuating the hydraulic circuit so as to vary the gear shift ratio of the continuously variable transmission and wherein the gear shift ratio detector detects the instantaneous gear shift ratio on the basis of an operation state of the actuator.

9. An apparatus for a continuously variable transmission as claimed in claim 8, wherein the actuator comprises a stepping motor and the gear shift ratio detector detects the instantaneous gear shift ratio on the basis of a stepped number of the stepping motor.

10. An apparatus for a continuously variable transmission as claimed in claim 9, wherein the continuously variable transmission is a V-belt type continuously variable transmission and wherein the abnormality monitor calculates determining gear shift ratios ($C_{PLS}$ and $C_{MNS}$) according to error upper and lower limit coefficients ($K_{MAX}$ and $K_{MIN}$) and the detected gear shift ratio $C_N$ as follows:

$$C_{PLS} = C_N \times K_{MAX}; \text{ and}$$

$$C_{MNS} = C_N \times K_{MIN},$$

calculates the following formula in place of the equation of $N_E = N_{PRI}$: $|N_E - N_{PRI}| \leq N\alpha$, wherein $N\alpha$ denotes an allowable limit value, calculates abnormality determining revolution speeds ($N_{PLS}$ and $N_{MNS}$) according to the abnormality determining gear shift ratios ($C_{PLS}$ and $C_{MNS}$) and the detected value of the second revolution speed ($N_{SEC}$) as follows:

$$N_{PLS} = N_{SEC} \times C_{PLS}; \text{ and}$$

$$N_{MNS} = N_{SEC} \times C_{MNS},$$

and identifies a failed one of the first, second, and third revolution speed sensors according to whether any one of combinations of three calculation formulae of $|N_E - N_{PRI}| \leq N\alpha$, $N_{MNS} \leq N_{PRI} \leq N_{PLS}$, and $N_{MNS} \leq N_E \leq N_{PLS}$ is established.

11. An apparatus for a continuously variable transmission as claimed in claim 10, wherein the abnormality monitor identifies that the failed one is the second revolution speed sensor when the formula of $|N_E - N_{PRI}| \leq N\alpha$ is established, but the formula of $N_{MNS} \leq N_{PRI} \leq N_{PLS}$ is unestablished ($N_{MNS} > N_{PRI}$ or $N_{PRI} > N_{PLS}$) and the formula of $N_{MNS} \leq N_E \leq N_{PLS}$ is unestablished ($N_{MNS} > N_E$ or $N_E > N_{PLS}$).

12. An apparatus for a continuously variable transmission as claimed in claim 10, wherein the abnormality monitor identifies that the failed one is the third revolution speed sensor when the formula of $|N_E - N_{PRI}| \leq N\alpha$ is Unestablished ($|N_E - N_{PRI}| > N\alpha$), but the formula of $N_{MNS} \leq N_{PRI} \leq N_{PLS}$ is established, but the formula of $N_{MNS} \leq N_E \leq N_{PLS}$ is unestablished ($N_{MNS} > N_E$ or $N_E > N_{PLS}$).

13. An apparatus for a continuously variable transmission as claimed in claim 10, wherein the abnormality monitor identifies that the failed one is the first revolution speed sensor when the formula of $|N_E - N_{PRI}| \leq N\alpha$ is unestablished ($|N_E - N_{PRI}| > N\alpha$), and the formula of $N_{MNS} \leq N_{PRI} \leq N_{PLS}$ is unestablished ($N_{MNS} > N_{PRI}$ or $N_{PRI} > N_{PLS}$) but the formula of $N_{MNS} \leq N_E \leq N_{PLS}$ is established.

14. An apparatus for a continuously variable transmission as claimed in claim 10, wherein the error upper and lower limit coefficients ($K_{MAX}$ and $K_{MIN}$) are variably set according to the detected vehicular running condition.

15. An apparatus for a continuously variable transmission as claimed in claim 10, wherein the abnormality monitor enlarges the values of the error upper and lower coefficients ($K_{MAX}$ and $K_{MIN}$) as the working oil temperature becomes low.

16. An apparatus for a continuously variable transmission as claimed in claim 14, wherein the vehicular running condition detector comprises a vehicular forward/backward acceleration sensor and a throttle valve opening angle sensor of an engine throttle valve.

17. An apparatus for a continuously variable transmission as claimed in claim 16, wherein the lock-up state determinator and the abnormality monitor are incorporated into a controller for controlling the step number of the stepping motor so as to vary the gear shift ratio of the V-belt type continuously variable transmission and perform a lock-up control for the lock-up mechanism.

18. An apparatus for a continuously variable transmission as claimed in claim 17, wherein the values of the error upper and lower coefficients ($K_{MAX}$ and $K_{MIN}$) are enlarged when the vehicle is accelerated or when a change rate of the instantaneous gear shift ratio from a previous gear shift ratio becomes large.

19. An apparatus for a continuously variable transmission, comprising:

first revolution speed detecting means for detecting a first revolution speed of an input axle of the continuously variable transmission;

second revolution speed detecting means for detecting a second revolution speed of an output axle of the continuously variable transmission;

gear shift ratio detecting means for detecting an instantaneous gear shift ratio of the continuously variable transmission; and abnormality monitoring means for reading detected values of the first and second revolution speeds from the first and second revolution speed sensors and the detected instantaneous gear shift ratio from the gear shift ratio detector and for determining whether at least either of the first or second revolution speed detecting means has failed on the basis of predetermined correlations between the respective detected values of the first and second revolution speeds and the detected instantaneous gear shift ratio.

20. A method for monitoring revolution speed values detected by corresponding revolution speed sensors and used to control at least a gear shift ratio of a continuously variable transmission to determine whether at least any one of the revolution speed sensors has failed, comprising the steps of:

detecting a first revolution speed of an input axle of the continuously variable transmission through a first revolution speed sensor;

detecting a second revolution speed of an output axle of the continuously variable transmission through a second revolution speed sensor;

determining an instantaneous gear shift ratio of the continuously variable transmission through a gear shift ratio detector; and reading detected values of the first and second revolution speeds from the first and second revolution speed sensors and the detected instantaneous gear shift ratio from the gear shift ratio detector and for determining whether at least either of the first or second revolution speed sensor has failed on the basis of predetermined correlations between the respective detected values of the first and second revolution speeds and the detected instantaneous gear shift ratio.

* * * * *